United States Patent

Gruler et al.

[15] 3,646,326

[45] Feb. 29, 1972

[54] ERROR DETECTING PULSE COUNTER

[72] Inventors: Josef Gruler, Aixheim; Bruno Borgonovi, Trossingen; Ernst Friedrich Henning Streitberger; Kurt Wilhelm Kratt, both of Aldingen, all of Germany

[73] Assignee: J. Hengstler K.G., Aldingen Kreis Tuttlingen, Germany

[22] Filed: Feb. 25, 1970

[21] Appl. No.: 13,963

[30] Foreign Application Priority Data

Mar. 1, 1969 Germany......................P 19 10 456.4

[52] U.S. Cl. ......................235/92 EC, 235/92 R, 235/92 C, 235/92 CA, 340/146.1

[51] Int. Cl. ......................H03k 21/34

[58] Field of Search............235/92 EC, 92 C, 92 EA, 92 CA; 340/146.1

[56] References Cited

UNITED STATES PATENTS 3,113,204 12/1963 O'Brien............................235/92 EA 3,049,692 8/1962 Hunt..............................340/146.1 A 3,237,157 2/1966 Higby.............................340/146.1 E

*Primary Examiner*—Maynard R. Wilbur

*Assistant Examiner*—Robert F. Gnuse

*Attorney*—Spencer and Kaye

[57] ABSTRACT

Mechanical counter drivers are adapted to receive counting pulses and to perform a counterdriving operation in response to each of said counting pulses. Input signal generators are coupled to said counter drivers and arranged to be shifted between two positions in response to each of said counterdriving operations. Output signal generators are arranged to be shifted between two positions in response to each of said counting pulses. Said positions assumed by said input and output signal generators have normally a predetermined relation. An error signal generator is adapted to compare the positions of said input and output signal generators and to generate an error signal when said positions of said input and output signal generators have another than said predetermined relation.

21 Claims, 12 Drawing Figures

INVENTORS.

Josef Gruler
Bruno Borgonovi
Ernst Friedrich Henning Streitberger
Kurt Wilhelm Kratt BY Spencer & Kaye
ATTORNEYS INVENTORS.
Josef Gruler
Bruno Borgonovi
Ernst Friedrich Henning Streitberger
Kurt Wilhelm Kratt BY Spencer & Kaye
ATTORNEYS.

INVENTORS.
Josef Gruler
Bruno Borgonovi
Ernst Friedrich Henning Streitberger
Kurt Wilhelm Kratt BY Spencer & Kaye
ATTORNEYS.

INVENTORS.

Josef Gruler
Bruno Borgonovi
Ernst Friedrich Henning Streitberger
Kurt Wilhelm Kratt Spencer & Kaye

BY ATTORNEYS.

INVENTORS.

Josef Gruler
Bruno Borgonovi
Ernst Friedrich Henning Streitberger
Kurt Wilhelm Kratt BY Spencer & Kaye

ATTORNEYS.

INVENTORS.

Josef Gruler
Bruno Borgonovi
Ernst Friedrich Henning Streitberger
Kurt Wilhelm Kratt BY Spencer & Kaye

ATTORNEYS.

ERROR DETECTING PULSE COUNTER

This invention relates to an error detector for use with electromechanical pulse counters, which detector produces a signal in response to a disturbance in the operation of the counter.

So-called back-signalling devices for electromechanical and electronic counters serve to check whether pulses received at the counter input have been properly handled. In electromechanical pulse counters, this check is made to find out whether each counting pulse has resulted in a single counting step of the low-order wheel.

The present invention provides a simple and reliable solution to this problem and eliminates the need for supplying current in addition to the incoming counting pulses. The error detector for use with pulse counters according to the invention is characterized in that mechanically operated input signalling means are provided at the driving end of the counter and in response to each counting step of the counter are shifted between two positions, and the position of said input signalling means is compared with the position of parallel-operated output signalling means.

The input signalling means may consist of a signal lever, which is controlled by a cam provided on the low-order wheel and the position of which is compared to the position of a parallel operated output signalling means. For this comparison both signalling means are operatively connected to the center contact of a changeover switch, which is operated by the cam by means of a pivoted lever. One solenoid or two parallel solenoids may be used to move the two signalling means to the opposite position.

A particularly simple design will be obtained if the input and output signalling means consist of stroke-performing means, which are moved in alternation and which have associated with them a bridge provided with a center contact, which in response to a disturbance of the change of stroke in either direction engages a normally open contact to initiate the error signal. The input and/or output signalling means may alternatively consist of noncontacting changeover switches, such as photoelectric or inductive transmitters. For use with zero-settable or resettable pulse counters the arrangement is such that the resetting of the input signalling means results also in a movement of the parallel-operated output signalling means to its basic position (opposite position) so that the proper initial position will always be achieved.

The parallel-operated output signalling means may consist of an electromechanical or electronic trigger stage, e.g., a latching relay, polarized relay or flip-flop. To match different response times of the signalling means, a delay line may be associated with the error signal output. In a signalling means which is accommodated in a counter housing, only an error signal output is required in addition to the two solenoid coil terminals.

According to another feature of the invention, the error signal output may be succeeded by a counting stage, which may be presettable and which may be used to set the number of counting errors which are permissible. A circuit for an automatic correction of the counting errors may be associated with the error signal output.

The device according to the invention will now be described more fully hereinafter. A mechanically operated signalling means is associated with the low-order wheel or with drive means directly connected to the low-order wheel and said signalling means changes its position in response to each counting step of said wheel so that successive counting operations result in a continual mechanical shifting of that signalling means. Various transmitters may be associated with that mechanically operated signalling means and may transform the continual shifts into mechanical or electric signals for utilization in succeeding signalling or operating devices.

To enable a utilization of this continually changing signal, a second shiftable element is driven in parallel to the counter to be supervised and just as the element associated with the pulse counter generates continually changing signals although the latter have the opposite significance. The indications of the two parallel-operated signalling means are continually compared and an error signal is derived only in response to the absence of mutually opposite signals.

Embodiments of devices according to the invention are diagrammatically shown in the drawing, in which FIG. 1 is an end view showing a pulse counter according to the invention comprising two solenoids, FIG. 2 is an end view showing a pulse counter according to the invention comprising one solenoid.

Figure 1:
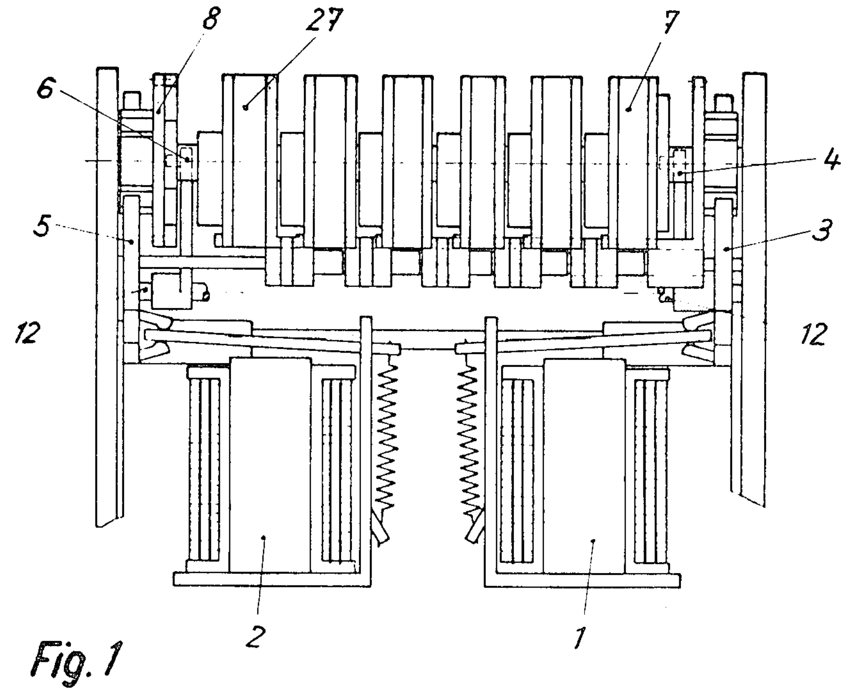
Figure 2:
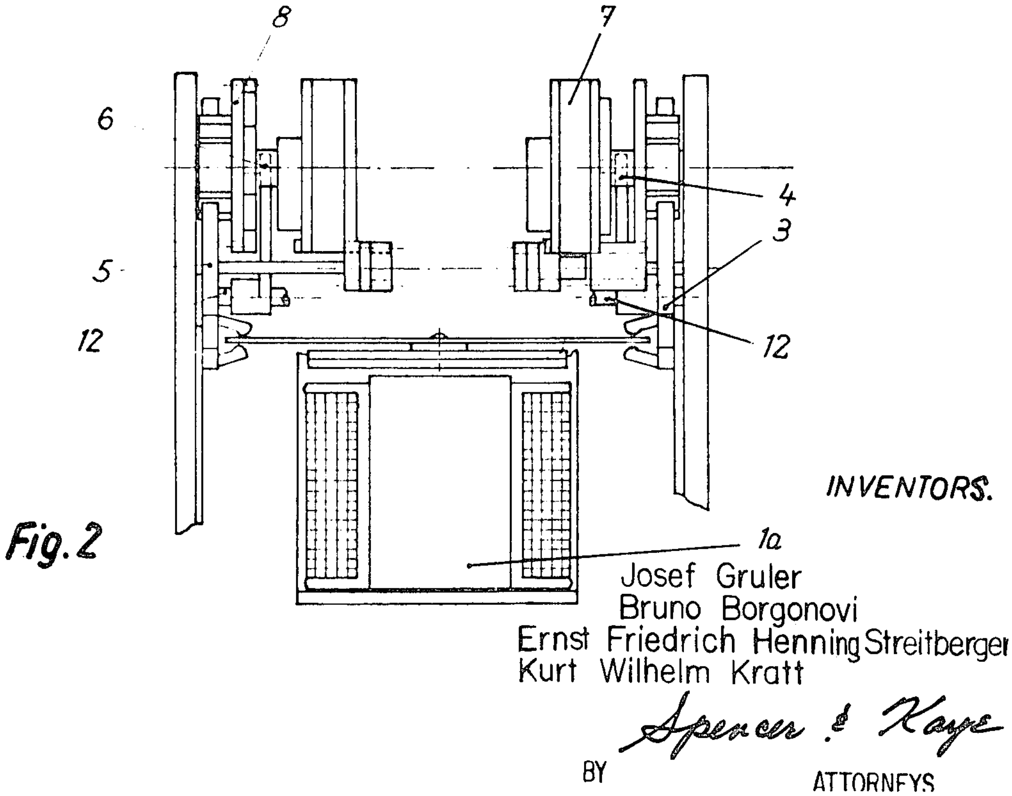
Figure 3:
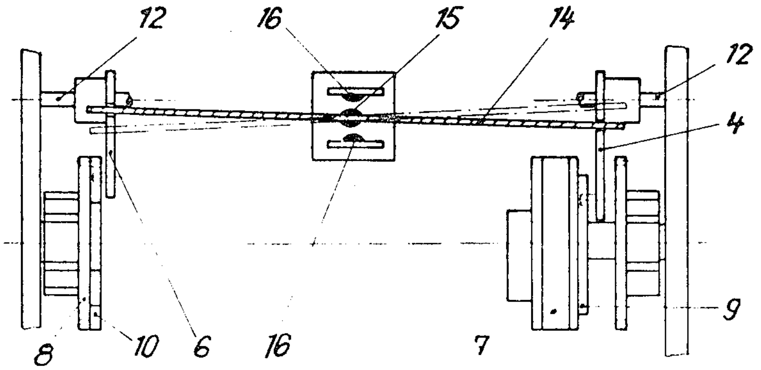
FIGS. 3 and 4 are end views showing a changeover switch of the counter of FIG. 2.

According to FIGS. 1 to 6, two identical solenoids 1, 2 are incorporated as mechanical driving means in a pulse counter. One solenoid 1 drives the counter by drive means 3 and operates input signalling means 4. The second solenoid 2 serves to drive the parallel-operated output signalling means 6 by drive means 5 (FIG. 1). For this purpose, the two solenoid coils of 1 and 2 are connected in parallel and are excited at the same time in response to an incoming counting pulse. Alternatively, a single solenoid 1*a* may be provided for the input signalling means 4 and output signalling means 6 (FIG. 2). In this case, a resilient connecting element is used for an operative connection to the drive means 3 and 5. This arrangement will be described with reference to FIGS. 3 and 4. Cams 9, 10 having cam tracks 11 which change radially between different radii are associated with the low-order wheel 7 of the counter and the stepping wheel 8 of the second drive means. Signalling levers 4, 6 are mounted on a parallel rod 12 and positively guided in these tracks. A simultaneous operation of the two drive means causes an alternating movement of these levers 4, 6 into mutually opposite positions.

These signalling levers 4, 6 are formed at their free end with an indentation 13, which receives a bridge member 14, which is integral with a contact spring and has an embossed crosspiece for higher stiffness. Contacts 15 are carried by the bridge in their center. If the counting operation proceeds without an error and the signalling levers 4, 6 are continually shifted between mutually opposite positions, the ends of the bridge 14 guided in said levers 4, 6 will follow these movements whereas there is almost no movement of the central portion of the bridge. Electrically interconnected contacts 16 are associated with and arranged on both sides of and at a suitable distance from this bridge center having contacts 15 on both sides so that a counting error of the counterdrive means will result in such change of the signal levers that there will be an engagement between the bridge contact 15 and one of the contacts 16 provided on both sides thereof.

Figure 4:
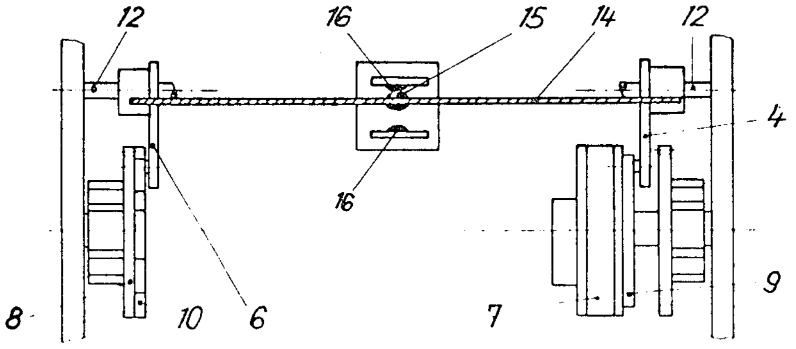
Figure 5:
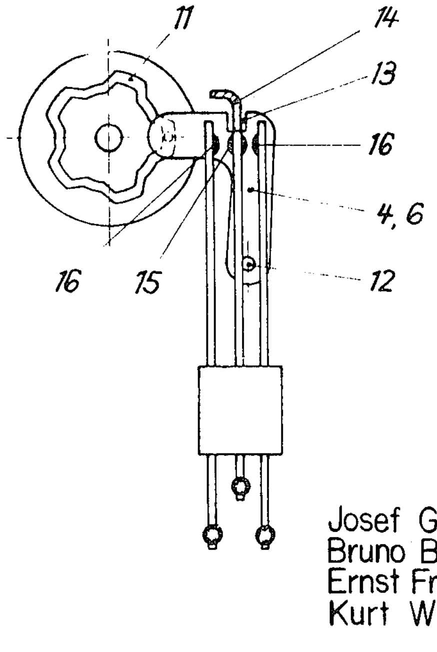
FIG. 5 is a side elevation showing the signalling means associated with FIGS. 3 and 4.
Figure 6:
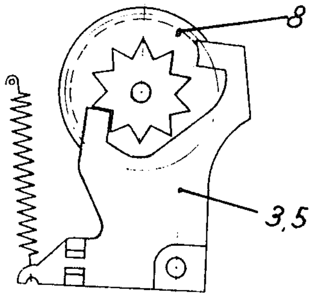
FIG. 6 is a side elevation showing the driving means of the counter of FIG. 2.

As is shown by way of example in FIG. 4, the error signal may be derived from that contacting operation if, e.g., the signal output is connected to the bridge 14, which is movable by the signal levers 4, 6, and the signal may be delivered by the associated contact and the pulse input connected thereto. In this case, the signalling means are moved during the second half-step so that differences between the switching times of the solenoids which are used will not change the signal. When a counting error is succeeded by correct counting operations, the error signal will be maintained until the counter is corrected. The correction may be made by a pulsed operation of a solenoid or mechanically by the operation of a special correcting key.

Figure 7:
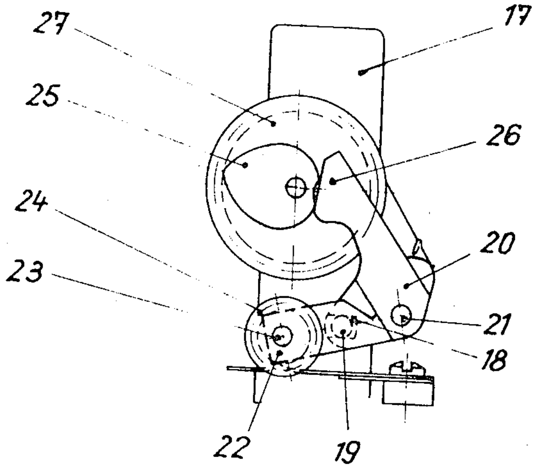
FIG. 7 is a side elevation showing the low-order wheel disposed at the input end of a counter which can be set to zero or reset.
Figure 8:
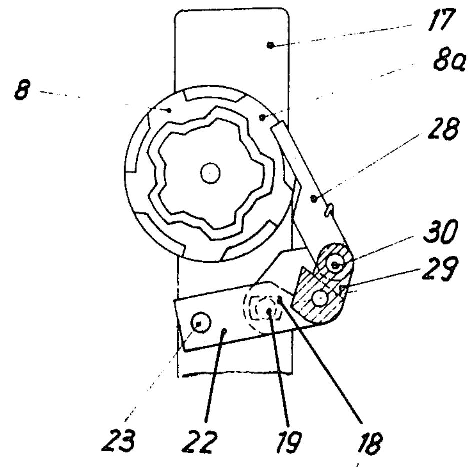
FIG. 8 is a side elevation showing the stepping wheel disposed at the output end of the counter of FIG. 6.

An additional arrangement as shown in FIG. 8 is required only when the counting error detector is used with zero-settable or resettable pulse counters. In conjunction with a zero-setting device known per se, which is shown in FIG. 7, the arrangement of FIG. 8 operates as follows:

When the zero-setting key 17 is depressed, a one-way coupling 18, 19 imparts a pivotal movement about an axis 21 to the zero-setting rake 20. At the same time, the pinion bridge 22 carrying pinions 24 which are mounted on the shaft 23 is disengaged and the cams 25 and 26 move the digit wheels 27 and 7 to the zero position. The arrangement shown in FIG. 8 serves now to shift the output signalling means 6 if the resetting has resulted in a shifting of the input signalling means. As a result, the signalling means 6 and 4 are in mutually opposite positions. A pusher pawl 28 is pivoted to a cranklike pivot pin 30, which is mounted on the zero-setting rake 29 and during the zero-setting operation engages one of the five teeth 8*a* of the stepping wheel 8 so that the latter is moved to the required position, which is opposite to that of the first signalling means 4. Because the stepping wheel 8 has five teeth 8*a*, it will perform this advance only if it is in a wrong position.

Figure 9:
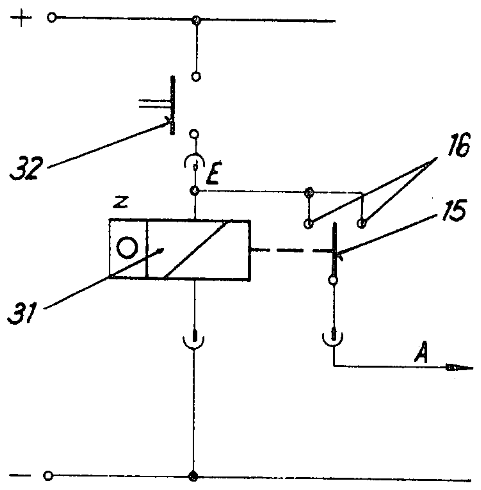
FIG. 9 is a circuit diagram showing a simple counter according to the invention.

To facilitate the understanding of the function, a simple circuit for the basic arrangement shown in FIGS. 1 to 6 is illustrated in FIG. 9. The pulse counter 31 is plug-connected in series with a pulse generator 32. The possibility to use one or two solenoids has not been illustrated. The central changeover contact 15, which is mechanically controlled by the two signalling means, is also plug-connected to the signal output whereas the two additional contacts 16 are electrically connected to the pulse input E within the pulse counter 31. If a counting operation is not performed and only one signalling means is shifted to the other position, the center contact 15 will engage one of the two contacts 16, as is shown in FIG. 4, so that the arrangement is primed for a delivery of an error signal. The subsequent electric pulse is then delivered by the mutually engaging contacts to the signal output A and the resulting error signal will be maintained until one of the two drives has been corrected.

Figure 10:
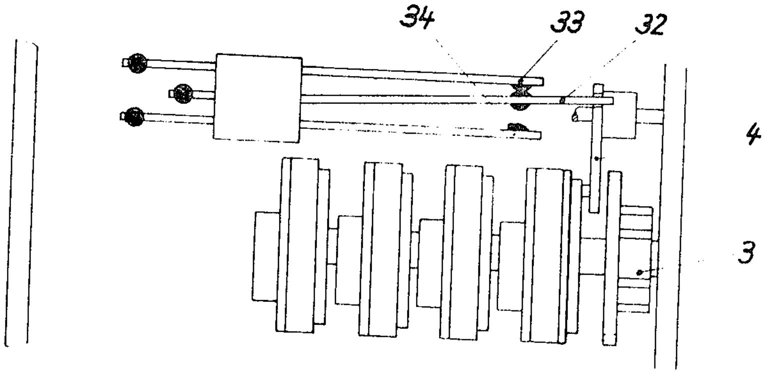
FIG. 10 is an end view showing another embodiment of the counter according to the invention and FIGS. 11 and 12 are two alternative circuit diagrams of the counter of FIG. 10.
Figure 11:
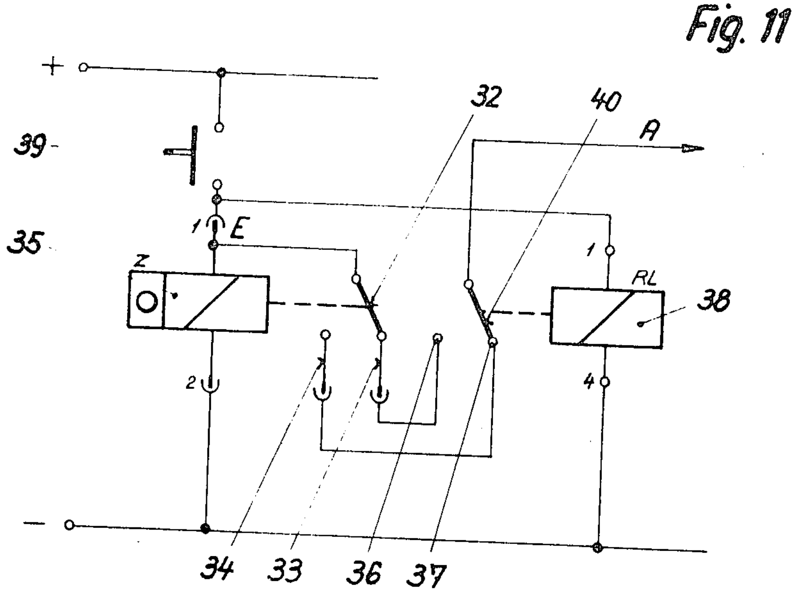

A modification of this arrangement is shown in FIGS. 10 and 11. The pulse counter incorporates only the first signalling means 4, which is associated with the counter drive 3 and engaged by a center contact 32 so that successive counting operations cause said center contact 32 to move alternatingly into engagement with contacts 33 and 34 disposed on both sides of contact 32. As is shown in FIG. 11, the center contact 32 of the pulse counter 35 is connected to the pulse input E and the additional contacts 33 and 34 are connected to contacts 36 and 37 of the latching relay 38. A simultaneous operation of the pulse counter 35 and the latching relay 38, which are connected in parallel, by the pulse generator 39 results in a simultaneous shifting of the two changeover contacts when the pulse has been terminated and the solenoid armatures are released. For this reason, the counting pulse which is delivered also to the center contact 32 can appear at the signal output A only when the pulse counter 35 or the parallel relay 38 have performed an improper operation, e.g., when a connection has been established from the center contact 32 to the associated contact 33 and from the latter via the contact 36, which is connected to contact 33, to the signal output A by way of the center contact 40.

Figure 12:
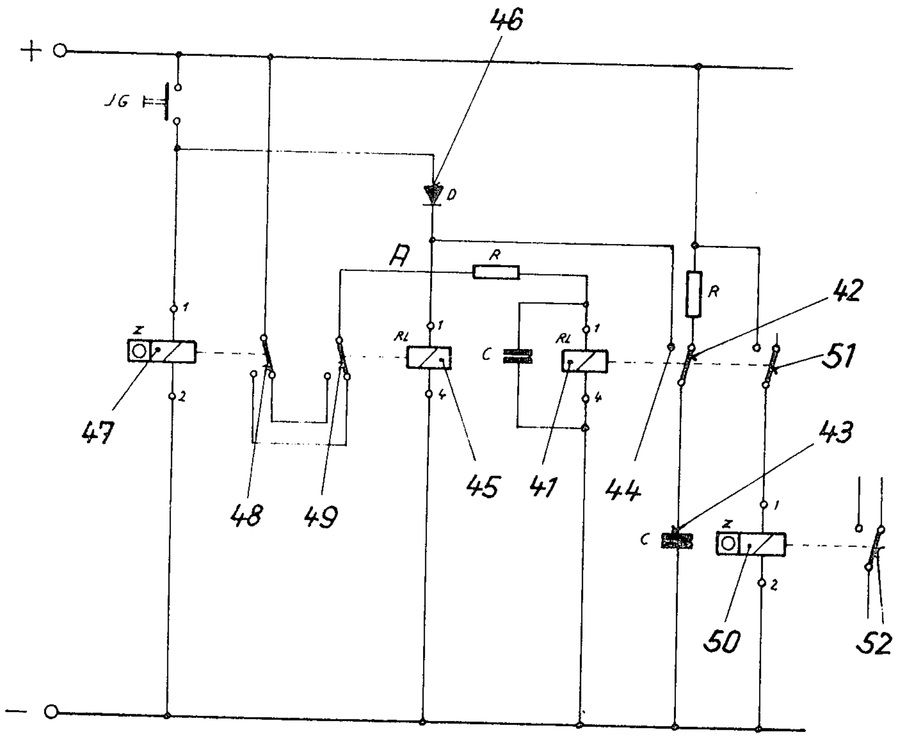

In another embodiment of the invention, shown in FIG. 12, the error signal output has connected to it a circuit for limiting the number of errors and for an automatic correction. In the circuit shown by way of example, the error signal output A is succeeded by a time-limit relay 41, which has a changeover contact 42, which in response to an error pulse is moved for a short time into engagement with contact 44 in known manner so that a pulse is delivered via the capacitor 43 to the latching relay 45. The blocking diode 46 prevents said pulse from acting on the parallel-connected pulse counter 47. As a result of this short-time correcting pulse, the contacts 48 and 49 assume mutually opposite positions and then prevent the delivery of an error signal in response to subsequent correct counting operations. In an additional further pulse counter 50, the contact 51 is also used for a summation of the number of corrections or counting errors. In another embodiment, a presettable pulse counter 50 may be used to preset a permissible number of errors and a signal used for any desired control purposes may be delivered at the associated contact 52 when a predetermined number of errors have occurred.

What is claimed is:

1. A pulse counter, which comprises
- mechanical counter drive means adapted to receive counting pulses and to perform a counterdriving operation in response to each of said counting pulses,
- input signalling means coupled to said counter drive means and arranged to be shifted between two positions in response to each of said counterdriving operations,
- output signalling means arranged to be shifted between two positions in response to each of said counting pulses,
- said positions assumed by said input and output signalling means having normally a predetermined relation,
- an error signal generator adapted to compare the positions of said input and output signalling means and to generate an error signal when said positions of said input and output signalling means are in another than said predetermined relation,
- a low-order wheel adapted to be driven by said counter drive means in response to each counting pulse, and
- a cam provided on said low-order wheel,
- said input signalling means comprising an input signal lever which is controlled by said cam,
- said error signal generator being adapted to compare the positions of said input signal lever and of said output signalling means.

2. A pulse counter as set forth in claim 1, which comprises
- a pivoted lever arranged to be operated by said cam,
- a changeover switch operatively connected to said pivoted lever and having a center contact which is operatively connected to said input and output signalling means.

3. A pulse counter as set forth in claim 1, which comprises
- solenoid means adapted to receive said counting pulses and adapted to move said input and output signalling means between said two positions thereof in response to each counting pulse,
- said input and output signalling means being normally in mutually opposite positions.

4. A pulse counter as set forth in claim 3, in which said solenoid means comprise two solenoids connected in parallel.

5. A pulse counter as set forth in claim 1, in which at least one of said input and output signalling means comprises a noncontacting changeover switch.

6. A pulse counter as set forth in claim 1, in which at least one of said input and output signalling means comprises a photoelectric transmitter.

7. A pulse counter as set forth in claim 1, in which at least one of said input and output signalling means comprises an inductive transmitter.

8. A pulse counter as set forth in claim 1, which is adapted to be set to zero and in which said output signalling means is arranged to assume a position which is in said predetermined relation to the position of said input signalling means in response to the resetting of the input signalling means.

9. A pulse counter as set forth in claim 1, which is resettable and in which said output signalling means is arranged to assume a position which is in said predetermined relation to the position of said input signalling means in response to the resetting of the input signalling means.

10. A pulse counter as set forth in claim 1, in which said output signalling means comprises an electromechanical trigger stage.

11. A pulse counter as set forth in claim 1, in which said output signalling means comprises an electronic trigger stage.

12. A pulse counter as set forth in claim 1, in which said output signalling means comprises a latching relay.

13. A pulse counter as set forth on claim 1, in which said output signalling means comprises a polarized relay.

14. A pulse counter as set forth in claim 1, in which said output signalling means comprises a flip-flop.

15. A pulse counter as set forth in claim 1, in which
said input and output signalling means have different response times and
said error signal generator comprises a delay line arranged to match said different response times.

16. A pulse counter as set forth in claim 1, which comprises
a housing which contains said input and output signalling means,
pulse input terminals carried by said housing,
solenoid coil means contained in said housing and connected to said input terminals and energizable by said pulses to operate said input and output signalling means, and
an error signal output means connected to said error signal generator and carried by said housing.

17. A pulse counter as set forth in claim 1, in which
said error signal generator is succeeded by a counter stage arranged to count said error signals.

18. A pulse counter as set forth in claim 17, in which
said counter stage is presettable to a permissible number of error signals.

19. A pulse counter as set forth in claim 1, which comprises correcting means for automatically causing said counter drive means to perform a counterdriving operation in response to each error signal.

20. A pulse counter, which comprises
mechanical counter drive means adapted to receive counting pulses and to perform a counterdriving operation in response to each of said counting pulses,
input signalling means coupled to said counter drive means and arranged to be shifted between two positions in response to each of said counterdriving operations,
output signalling means arranged to be shifted between two positions in response to each of said counting pulses,
said positions assumed by said input and output signalling means having normally a predetermined relation,
an error signal generator adapted to compare the positions of said input and output signalling means and to generate an error signal when said positions of said input and output signalling means are in another than said predetermined relation,
first and second cams,
first and second pivoted levers operatively connecting said cams to said input and output signalling means, respectively, and
a changeover switch having a central contact which is operatively connected to the input and output signalling means.

21. A pulse counter, which comprises
mechanical counter drive means adapted to receive counting pulses and to perform a counterdriving operation in response to each of said counting pulses,
input signalling means coupled to said counter drive means and arranged to be shifted between two positions in response to each of said counterdriving operations, said input signalling means comprising a first reciprocating stroke performing means,
output signalling means arranged to be shifted between two positions in response to each of said counting pulses, said input signalling means comprising a second reciprocating stroke-performing means,
said positions assumed by said input and output signalling means having normally a predetermined relation, and
an error signal generator adapted to compare the positions of said input and output signalling means and to generate an error signal when said positions of said input and output signalling means are in another that said predetermined relation, said error signal generator comprising a first contact and a bridge which is associated with said two stroke-performing means and comprises a center contact arranged to engage said first contact when one of said stroke-performing means performs a stroke whereas the other does not.

* * * * *